(12) United States Patent
Putnam

(10) Patent No.: US 10,716,427 B2
(45) Date of Patent: Jul. 21, 2020

(54) SINGLE-SERVING BEVERAGE CARTRIDGE CONTAINER

(71) Applicant: Portage Plastics Corporation, Portage, WI (US)

(72) Inventor: Kevin Putnam, Pardeeville, WI (US)

(73) Assignee: Portage Plastics Corporation, Portage, WI (US)

( * ) Notice: Subject to any disclaimer, the term of this patent is extended or adjusted under 35 U.S.C. 154(b) by 108 days.

(21) Appl. No.: 15/896,769

(22) Filed: Feb. 14, 2018

(65) Prior Publication Data

US 2018/0228314 A1 Aug. 16, 2018

Related U.S. Application Data

(60) Provisional application No. 62/459,029, filed on Feb. 14, 2017.

(51) Int. Cl.
| | |
|---|---|
| *A47J 31/06* | (2006.01) |
| *B65D 21/02* | (2006.01) |
| *B65D 3/30* | (2006.01) |
| *B65D 3/04* | (2006.01) |
| *B65D 85/80* | (2006.01) |
| *B65D 3/12* | (2006.01) |

(Continued)

(52) U.S. Cl.
CPC ....... *A47J 31/0678* (2013.01); *A47J 31/0673* (2013.01); *B65D 1/26* (2013.01); *B65D 1/28* (2013.01); *B65D 1/44* (2013.01); *B65D 3/04* (2013.01); *B65D 3/12* (2013.01); *B65D 3/30* (2013.01); *B65D 21/0201* (2013.01); *B65D 21/0233* (2013.01); *B65D 85/8043* (2013.01); *B65D 2585/6815* (2013.01)

(58) Field of Classification Search
CPC ................ A47J 31/0678; A47J 31/0673; A47J 31/0668; A47J 31/0657; B65D 3/04; B65D 3/12; B65D 3/10; B65D 3/02; B65D 3/30; B65D 21/0201; B65D 85/8043; B65D 85/804; B65D 1/46; B65D 1/44; B65D 1/42; B65D 1/40
USPC ....... 220/669, 670, 671, 673, 657, 658, 656, 220/737; 426/79, 113, 112; 99/295
See application file for complete search history.

(56) References Cited

U.S. PATENT DOCUMENTS 3,082,900 A * 3/1963 Goodman .............. B65D 1/265
220/592.17
D198,139 S 5/1964 Edwards
(Continued)

*Primary Examiner* — Robert J Hicks
(74) *Attorney, Agent, or Firm* — Boyle Fredrickson S.C.

(57) ABSTRACT

A cup having an endless sidewall with a lower stacking shoulder formed of a sidewall and bottom heel including a convexly outwardly curved rib disposed at a transition between the sidewall and a cup bottom having a bottom wall having a recessed dome-shaped center section providing draw ratio bottom wall thickness reduction to an annular flat bottom wall section defining a puncture region of the cup. The cup sidewall has a ribbed section disposed adjacent the heel and extends upwardly at least one-quarter the height of the cup helping to strengthen the relatively thin sidewall to prevent it from undesirably deforming during puncturing of the cup bottom during beverage making. The cup may include an upper shoulder formed of an outwardly expanded section of the sidewall adjacent the top of the cup and defining an filter attachment seat on one side and a cup carrier on the opposite side.

20 Claims, 12 Drawing Sheets

(51) Int. Cl.
  *B65D 1/28* (2006.01)
  *B65D 1/26* (2006.01)
  *B65D 1/44* (2006.01)
  *B65D 85/804* (2006.01)

(56) References Cited

U.S. PATENT DOCUMENTS

| | | | |
|---|---|---|---|
| D198,721 S | 7/1964 | Eicholtz | |
| 3,215,325 A | 11/1965 | Shappell et al. | |
| D213,428 S | 3/1969 | Toledo | |
| 3,443,714 A * | 5/1969 | Edwards | B65D 1/265 220/671 |
| 3,527,020 A | 9/1970 | Mancini | |
| 4,685,273 A * | 8/1987 | Caner | B65B 7/2878 53/440 |
| D351,790 S | 10/1994 | Haindl | |
| D474,110 S | 5/2003 | Sweeney | |
| 6,645,537 B2 * | 11/2003 | Sweeney | B65D 85/8043 206/222 |
| 6,810,788 B2 * | 11/2004 | Hale | B65D 85/8043 426/433 |
| D577,288 S | 9/2008 | Wilson et al. | |
| 7,677,435 B2 | 3/2010 | Stahlecker | |
| 8,328,043 B2 * | 12/2012 | Kessell | B65D 1/40 220/666 |
| 8,361,527 B2 | 1/2013 | Winkler et al. | |
| D698,649 S | 2/2014 | Quint | |
| D700,839 S | 3/2014 | O'Brien et al. | |
| 8,701,923 B2 * | 4/2014 | Anhalt | B65D 1/22 206/557 |
| D715,649 S | 10/2014 | O'Brien | |
| 9,114,902 B2 | 8/2015 | Temple, Jr. | |
| 9,266,660 B2 | 2/2016 | Cai et al. | |
| 9,271,602 B2 | 3/2016 | Beaulieu et al. | |
| 9,326,635 B2 | 5/2016 | Koestring et al. | |
| 9,555,957 B2 | 1/2017 | Winkler et al. | |
| 9,629,495 B2 | 4/2017 | Koestring et al. | |
| 9,657,155 B2 | 5/2017 | O'Brien et al. | |
| D832,035 S | 10/2018 | Scheiber et al. | |
| 2005/0173287 A1 | 8/2005 | Smith et al. | |
| 2009/0200301 A1 | 8/2009 | Beekman et al. | |
| 2010/0288131 A1 * | 11/2010 | Kilber | A47J 31/0673 99/295 |
| 2011/0142996 A1 * | 6/2011 | Kruger | B65B 29/022 426/80 |
| 2014/0178538 A1 * | 6/2014 | Husband | A47J 31/446 426/115 |

* cited by examiner

SINGLE-SERVING BEVERAGE CARTRIDGE CONTAINER

CROSS-REFERENCE TO RELATED APPLICATION

This application claims priority to U.S. Provisional Application No. 62/459,029, filed on Feb. 14, 2017, the entire contents of which are hereby expressly incorporated by reference into this application.

FIELD

The present invention is directed to a pierceable cup for a single serving beverage cartridge or pod, and more particularly to such a stackable cup having improved stacking, a more optimal shoulder area to which an in-cup filter can be anchored, and cup sidewall with strengthening ribs.

INTRODUCTION

Beverage preparation systems are well known in the art where a predetermined amount of a beverage-making ingredient, such as ground, freeze dried, or instant coffee, tea, or another type of beverage-making ingredient is packaged inside a beverage cartridge, which is purchased by a consumer who then places it into a beverage-making apparatus. The beverage-making apparatus then introduces water into the beverage cartridge, where it dissolves, extracts, emulsifies, or dilutes the beverage-making ingredient(s) to produce a beverage that flows from the cartridge into a cup, mug or glass the consumer can drink. In nearly all of these beverage preparation systems, hot water is injected into the cartridge with the beverage-making ingredient in the cartridge thereby infusing the water in a manner that brews or steeps the beverage from the beverage-making ingredient which flows via gravity to a cup, mug or glass disposed underneath the cartridge. For example, coffee making systems well known in the art utilize single-serving cartridge containing ground, freeze dried or instant coffee into which hot water is injected that infuses the hot water producing brewed coffee that flows downwardly into a coffee mug, cup or another drinking container. The brewed beverage, typically coffee, exits the cartridge through one or more openings or perforations in the cartridge bottom where the brewed beverage flows or falls downwardly into the cup, mug or another drinking container.

The beverage-making cartridge typically is disposable formed of a container, typically in the form of a cup, which holds the beverage-making ingredients and which can include a filter inside the container used to allow water to pass through the beverage-making ingredient in the container to infuse the water while retaining the spent or unused beverage making ingredient within the container. The cartridge can and typically does include a lid or cover that can be of piercable and/or removable construction. In making a beverage-making cartridge, beverage making ingredients are inserted into the container, e.g., cup, together with a perforate or porous filter that typically is anchored to part of the inner surface of the container.

Various beverage-making cartridge embodiments are disclosed in U.S. Pat. Nos. 5,325,765, 6,645,537, 8,474,368, and 9,114,902, the entirety of each of which is hereby expressly incorporated herein by reference. While such beverage-making cartridges have enjoyed substantial commercial success, improvements nonetheless remain desirable as discussed in more detail in the Detailed Description section of this application.

SUMMARY

By way of summary, the present invention is directed to a cup for a single serving cartridge. The cup may include a top with an open mouth, a bottom with a bottom wall having a generally planar bottom wall comprised of a puncture region, and a sidewall of endless tubular construction. The sidewall may include a diametrically expanded upper shoulder at or adjacent the top that defines an external cup carrier and internal filter attachment seat, and a ribbed section comprised of at least a plurality of ribs disposed at or adjacent the bottom of the cup.

The cup may include a bottom stacking shoulder located at or adjacent the bottom. The stacking shoulder may include a generally toroidal rib at the bottom the cup providing a transition between the sidewall of the cup and the bottom wall of the cup. Further, the generally toroidal rib may be convexly curved at a radius of curvature of at least 2 millimeters. The generally toroidal rib at the bottom of the cup may also orient the sidewall of the cup at a draft angle up to 13° inward, and preferably up to 8° inward.

The ribbed section of the cup may include a plurality of annular axially spaced apart and adjoining ribs. The ribs of the ribbed section may form a ribbed section of sawtooth construction and each of the ribs of the ribbed section may have a generally triangular cross-section. The ribbed section may extend along the sidewall of the cup at least one-quarter the axial height of the cup. The ribbed section may also extend along the sidewall of the cup at least one-quarter the axial height of the sidewall. Further, the ribs of the ribbed section may reduce the diameter of the sidewall as the ribbed section progress toward the bottom of the cup. The ribs of the ribbed section may range in height from about 3.87 to 4.10 millimeters. In addition, the height of the rib of the ribbed section adjacent the bottom of the cup is greater than a height of a rib of the ribbed section further away from the bottom of the cup.

The bottom of the cup includes a recessed dome-shaped center section and puncture region. The puncture region may be formed by an annular generally planar section of the bottom wall of the cup. The top of the cup may include a radially outwardly extending flange defining a lip to which a cover or lid may be attached to make a beverage cartridge. A filter seat may be formed by an inner surface of the upper shoulder of the sidewall. Further, a perforate or porous filter may be attached to the filer seat.

The cup may be formed a multilayer laminate or film material formed of at least one layer of plastic. The multilayer laminate or film material may be at least one layer of polypropylene. Further, the polypropylene layer may be comprised of polypropylene including at least one additive. The multilayer laminate or film material may also include at least a plurality of pairs of layer.

These and other aspects and objects of the present invention will be better appreciated and understood when considered in conjunction with the following description and accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

DRAWING DESCRIPTION

One or more preferred exemplary embodiments of the invention are illustrated in the accompanying drawings in which like reference numerals represent like parts throughout and in which.

Figure 1:
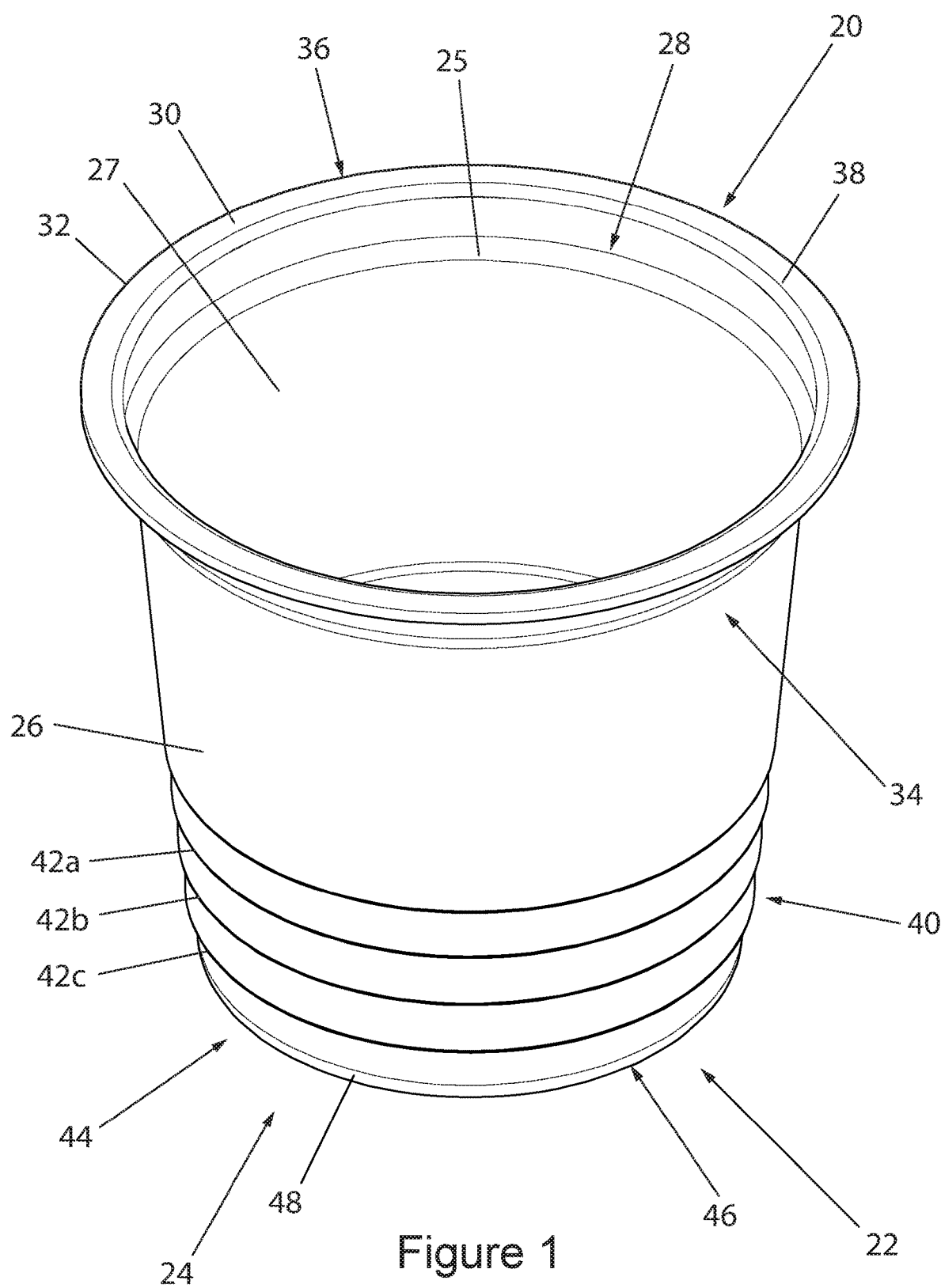
FIG. 1 is a top front perspective view of a container or cup for use in making a single-serving cartridge, according to an embodiment of the invention.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

FIGS. 1-5 illustrate a preferred embodiment of a container 20 that preferably is shaped as a cup 22 and formed of plastic that is configured for use in a single-service beverage cartridge (not shown) of a beverage preparation system that is used in a beverage-making apparatus such as for making a single serving of coffee, tea or the like. The single-serving beverage cartridge cup 22 has a bottom 24 from which upwardly extends an endless generally cylindrical sidewall 26 defining an open top 28 through which one or more beverage-making ingredients can be and preferably are introduced in making a single-serving beverage cartridge. Such beverage-making ingredients (not shown) can be in the form of ground, pulverized, dried, e.g., freeze dried, powdered, or other type of beverage-making ingredients in dry form from which a liquid beverage can be made when infused into water introduced into the container. In addition, a filter (not shown) made of cellulose and/or synthetic fiber that can be of conical, circular or cylindrical construction is also introduced through the container opening 28 either separately or together with the beverage-making ingredients forming a single-serving beverage cartridge that includes a lid covering the opening 28. With the lid covering the container opening enclosing the beverage-making ingredients and filter within the container, the cup 22 forms a single-serving cartridge of pre-packaged and ready to use construction that can be sold in such a form for consumer use.

U.S. Pat. Nos. 5,325,765, 6,645,537, and/or 8,474,368, the entirety of each of which is hereby expressly incorporated herein by reference, provide examples of in-cup filters for use with the cup 22 of the present invention for making such a single-serving beverage cartridge, as described above. When such an in-cup filter is placed, inserted or formed in or with the cup 22 and beverage-making ingredients dispensed in the cup 22 before the cup opening 28 is covered with a lid, a single-serving beverage cartridge is formed that is of a type like those shown and disclosed in U.S. Pat. Nos. 5,325,765, 6,645,537, and/or 8,474,368, the entirety of each of which is hereby expressly incorporated herein by reference.

The cup 22 is molded, preferable thermoformed, and more preferably vacuum-thermoformed of a plastic, such as polystyrene, ethylene vinyl alcohol, polyethylene, or polylactide aliphatic copolymer, e.g., CPLA. The cup 22 may also be formed of other materials, such as, but not limited to thermoplastic materials that can be or otherwise include polyolefins like polypropylene, polyethylene, polystyrene, nylon, and other suitable thermoplastic polymers.

As discussed in further detail below, the three-dimensional configuration of a cup 22 of the present invention particularly enables the cup 22 to be formed of a more recyclable thermoplastic material, such as a bio-based resin, preferably a polypropylene base resin, and more preferably a recycled polypropylene base resin, and yet still be punctured without substantial deformation of the cup 22 during beverage making. Any of the aforementioned thermoplastic materials from which cup 22 can be made can also be or include a blend, such as where the thermoplastic material is blended with one or more additives that include acrylics, styrenics, e.g., styrenes, polyolefin copolymers, which can be immiscible in nature. Such additives can be or also include one or more crack nucleating agents like calcium stearate, magnesium stearate, zinc stearate, calcium carbonate, talc, clay(s), e.g., smectite, bentonite, montmorillonite, etc., and the like. Any of these additives can be in Nano particle form.

In the representative embodiment of FIGS. 1-5, the cup 22 is molded of a multilayered film or laminate material having at least a plurality of layers and more preferably having at least a plurality of pairs of, i.e. at least 3, layers with at least one of the layers made or otherwise composed of a recyclable or recycled plastic material that preferably is a bio-based resin, more preferably is a polypropylene resin, and even more preferably is a recycled polypropylene resin. One or more of the layers can be and preferably are made of re-grind material, preferably regrind polypropylene material, or another suitable regrind thermoplastic polymeric material. In a preferred embodiment, cup 22 is molded from a multilayer laminate material having at least 5 layers that include a thermoplastic polymer layer, a tie layer, a barrier layer, another tie layer, and another thermoplastic layer with one or both thermoplastic layers made or otherwise composed of a recyclable or recycled plastic material that preferably is a bio-based resin, more preferably is a polypropylene resin, and even more preferably is a recycled polypropylene resin that can be a blend containing one or more of the aforementioned additives. In another preferred embodiment, cup 22 is molded from a multilayer laminate material having at least 7 layers that include a first thermoplastic polymer layer, a first regrind layer, a first tie layer, a first barrier layer, a second tie layer, a second regrind layer, and a second thermoplastic layer with one or both thermoplastic layers made or otherwise composed of a recyclable or recycled plastic material that preferably is a bio-based resin, more preferably is a polypropylene resin, and even more preferably is a recycled polypropylene resin that can be a blend containing one or more of the aforementioned additives If desired, one or more of the layers can be or otherwise form a barrier layer and/or a tie layer as is known in the art.

Examples of suitable multilayer laminate materials from which a cup 22 constructed in accordance with the present invention can be molded are disclosed in U.S. Pat. No. 9,114,902, the entirety of which is hereby expressly incorporated herein by reference. U.S. Pat. No. 9,114,902 also shows and discloses molds, molding apparatus and a method of molding that can be used to make cup 22.

Figure 2:
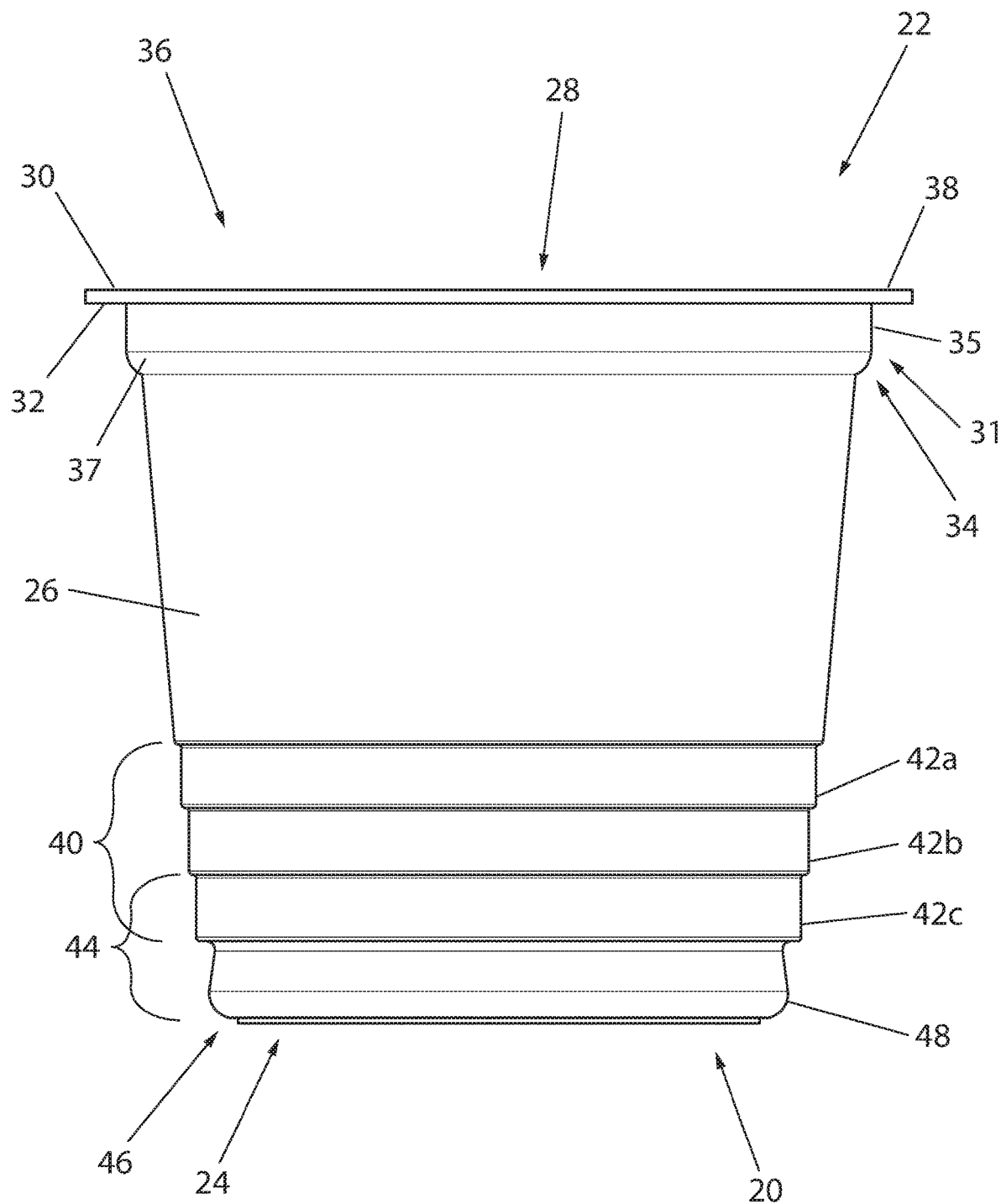
FIG. 2 is a side elevation of the container or cup of FIG. 1.
Figure 3:
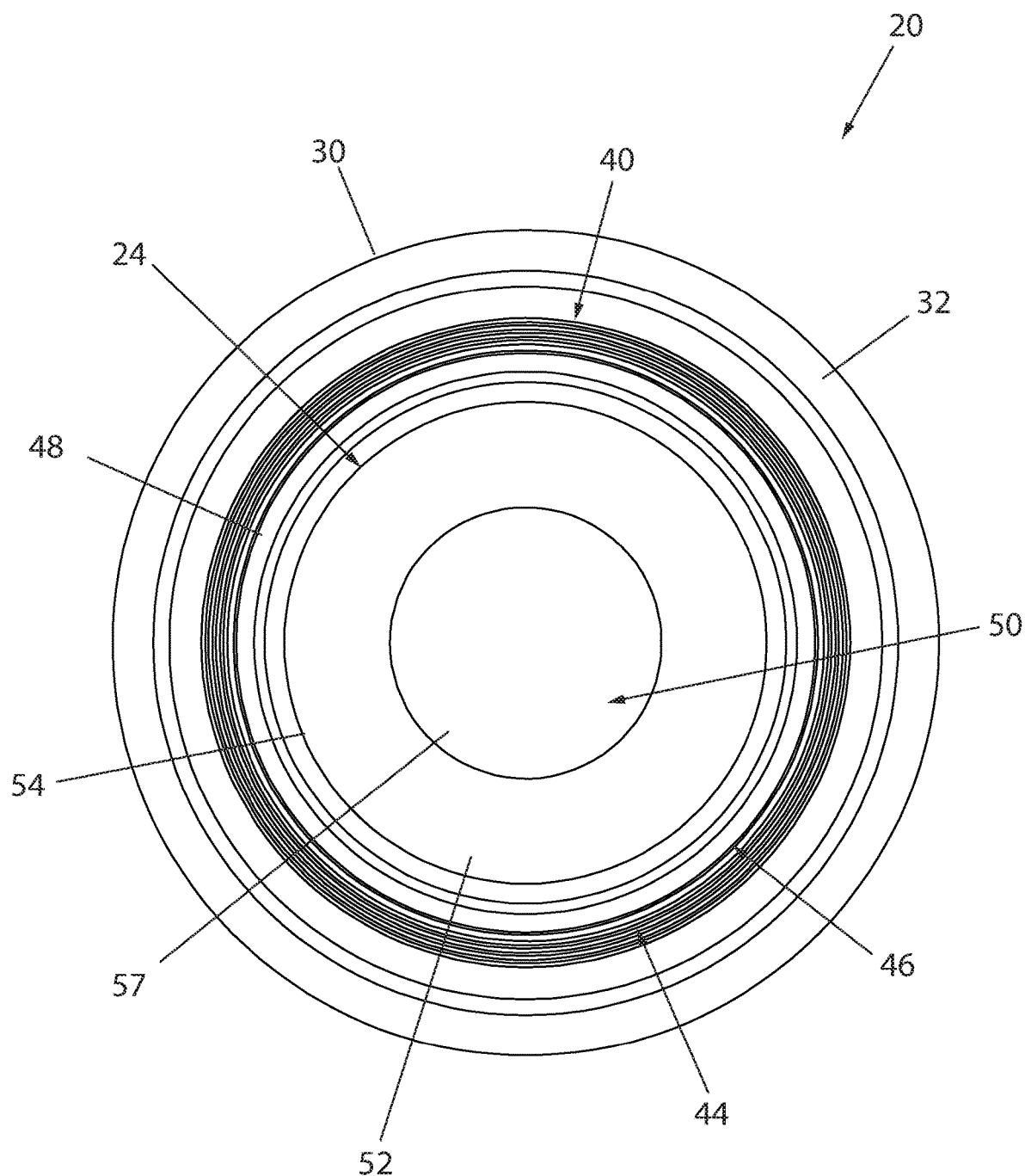
FIG. 3 is a bottom plan view of the container or cup of FIG. 1.
Figure 4:
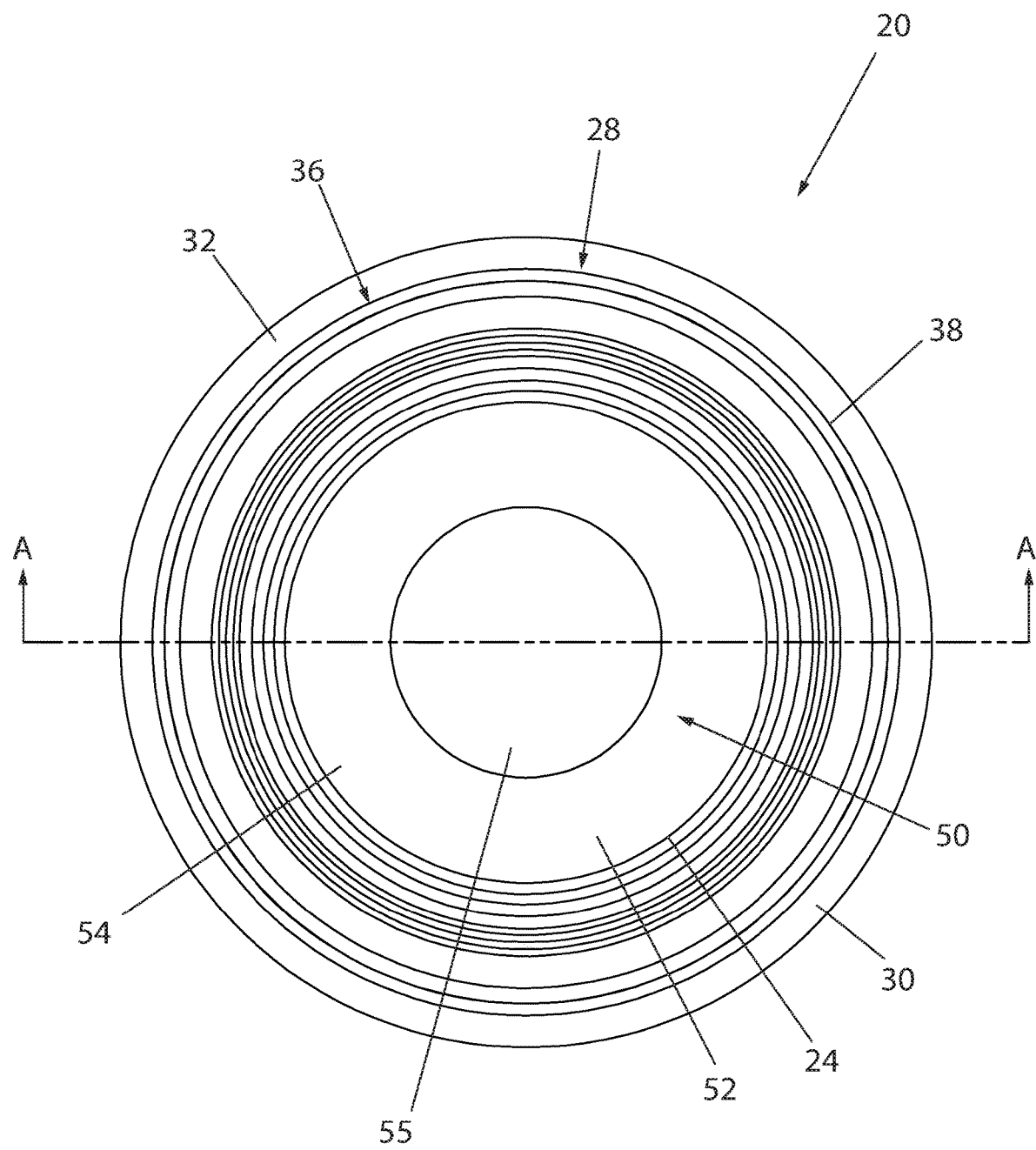
FIG. 4 is a top plan view of the container or cup of FIG. 1.

Continuing to refer to FIGS. 1-5, the opening 28 at the top of the cup 22 is bounded by a lip 30 formed of a flange 32 extending radially outward from an annular shoulder 34 formed in a top or upper portion of the cup sidewall 26. Annular shoulder 34 is formed of a diametrically expanded segment 35 of the sidewall 26 that extends downward from the lip 30 or flange 32 to a diametrically reducing bevel 37 that extends radially outward about the periphery of the sidewall 26, as shown in FIG. 2.

In the representative embodiment of the invention, segment 35 has a diameter of 45.35 millimeters. However, the diameter of segment 35 may be more or less than 45.35 millimeters in other embodiments of the invention. FIG. 2 also illustrates bevel 37 having a radius of 1.52 millimeters. It is contemplated that the radius of bevel 37 may be more or less than 1.52 millimeters.

Figure 5:
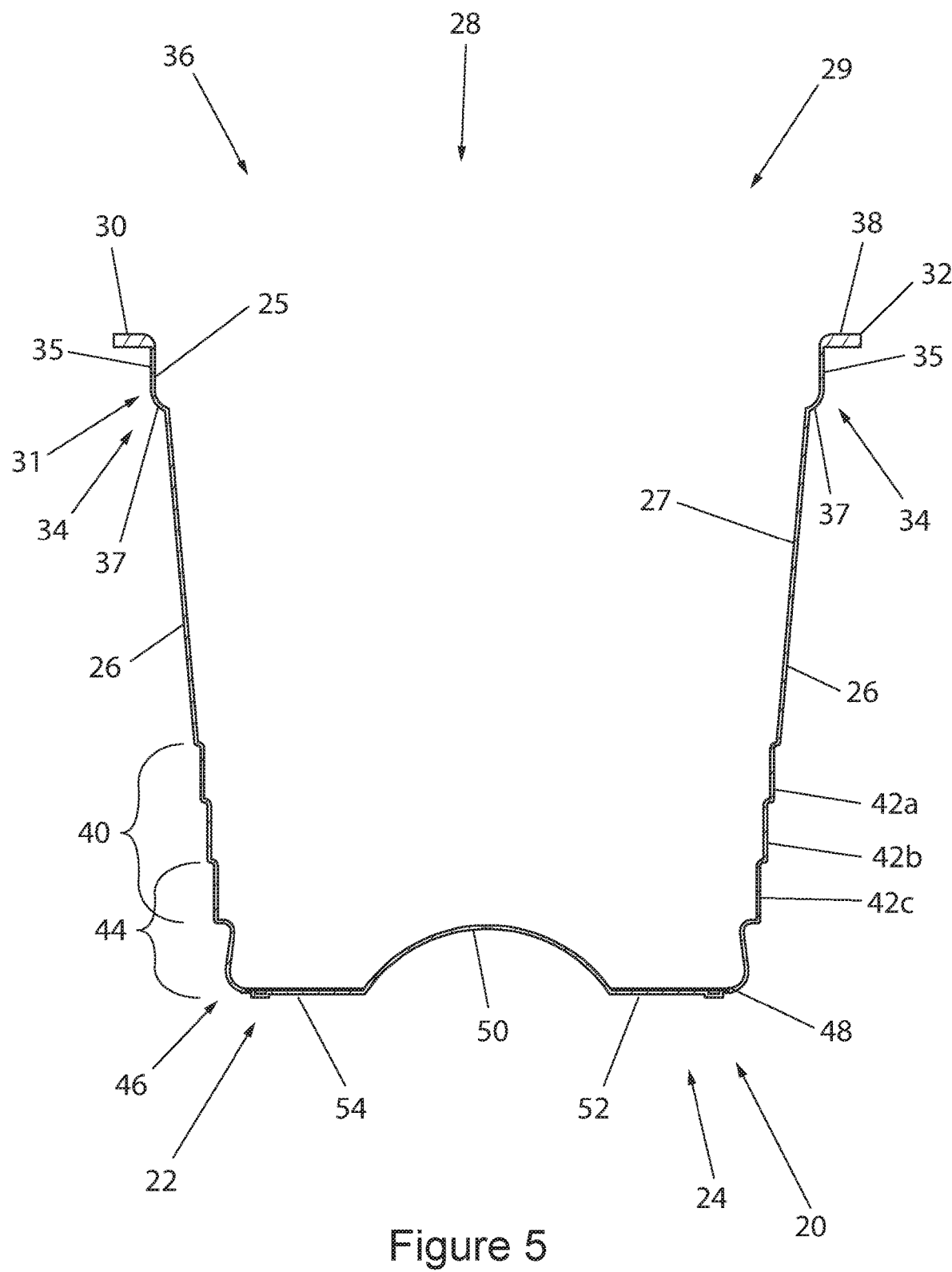
FIG. 5 is a cross-sectional view of the container or cup of FIG. 4 taken through the cut A-A.

The shoulder 34 is formed without draft, e.g., without backdraft, as depicted in FIG. 5, thereby defining an annular filter seat 25 along part of an interior surface 27 of the sidewall 26 and providing greater surface area for filter attachment during beverage cartridge assembly. Since the cup 22 is molded with a shoulder 34 that is of draft-less construction by being formed with no draft whatsoever, the filter seat 25 has more surface area for the filter to contact during attachment, e.g., adhesive attachment, thermal welding, sonic welding, or the like, of part of the filter to the seat 25.

The shoulder 34 formed without a draft, e.g., without a backdraft, formed of diametrically expanded portion 35 of the cup sidewall 26, and disposed along a top 29 of the cup 22 also defines an external cup-carrier seat 31 enabling the shoulder 34 to be received in a cup-carrier of a beverage cartridge filling line. As a result, the cup 22 formed with a draft-less shoulder 34 is advantageous because the draft-less shoulder 34 externally defines a cup-carrier seat 31 on one side of the sidewall 26, while also defining a filter-attachment seat 25 on the other side of the sidewall 26.

The lip 30 or flange 32 that bounds the opening 28 at the top of the cup 22 also defines a mouth 36 of the cup 22 through which the beverage-making ingredients and/or filter is inserted during beverage cartridge assembly. In the representative embodiment of the invention, the lip 30 has an outer diameter of 50.50 millimeters and a width of 2.73 millimeters. In other embodiments of the invention, it is contemplated that the outer diameter and width may be independently more or less than the measurements described above with respect to FIG. 2. A lid or cover is attached to the cup 22 to complete assembly of the beverage cartridge using cup 22 of the present invention preferably with at least part of the lid or cover sealed, preferably hermetically sealed, to a top surface 38 of the lip 30. When sealed to the lip 30 of the cup 22, a hermetically sealed beverage making cartridge also of the present invention is formed that keeps the beverage making ingredients ready to brew for several months, if not longer. One advantage of the present invention as described above is a beverage making cartridge having a longer shelf life.

The sidewall 26 of the cup 22 is of endless construction and preferably diametrically tapers as the sidewall 26 extends axially downward toward the bottom 24 of the cup 22. In a preferred embodiment, the sidewall 26 diametrically tapers from at or adjacent the shoulder 34 and/or lip 30 of the cup 22 all the way to the bottom 24 of the cup 22 at an angle of 5°. However, the sidewall 26 may diametrically taper at any angle more or less than 5° in varying embodiments of the invention. Such a diametrically tapering cup sidewall 26 as described above produces a cup 22 with a generally frustoconical sidewall 26.

The cup sidewall 26 also includes a cup-strengthening ribbed section 40 formed along a lower or bottom portion of the sidewall 26 to or adjacent the bottom 24 of the cup 22. The ribbed section 40 is formed of at least a plurality of strengthening ribs 42. FIG. 2 depicts a preferred embodiment of the invention wherein the ribbed section 40 includes 3 strengthening ribs 42a, 42b, 42c axially spaced apart but axially stacked upon one another such that each one of the ribs 42a, 42b, 42c is disposed axially adjacent and/or axially adjoins an adjacent another one of the ribs 42a, 42b, 42c. The use of 3 strengthening ribs 42a, 42b, 42c, as described below, results in a cup 22 having improvement structure to resist deformation during puncture of the bottom 24 of the cup 22 while also allow stacking and nesting of the number of cups 22 with minimal interference between adjacent cups 22. In other embodiments of the invention, more or less the sidewall 26 may include more or less than 3 strengthening ribs 42. For example, FIGS. 6-12 illustrate an embodiment of the invention including 4 strengthening ribs 42.

In the representative embodiment of the invention, the ribbed section 40 extends upward from at or adjacent the bottom 24 of the cup 22 at least one-fifth, preferably at least one-fourth, and more preferably at least one-third the axial length of the sidewall 26 toward the flange 32 or lip 30 at the top of the cup 22. In FIG. 2, the ribbed section 40 extends 12.26 millimeters, while the sidewall has an axial length of 44.19 millimeters. However, the ribbed section may extend more or less than 12.26 millimeters and the axial length of the sidewall 26 may be more or less than 39.84 millimeters in varying embodiment of the invention.

As shown in FIG. 2, each strengthening rib 42 changes the diameter of the sidewall 26. That is, the diameter of the sidewall 26 is reduced as the ribbed section 40 progresses from strengthening rib 42a to strengthening rib 42b, and so on toward the bottom 24 of the cup 22. For example, the diameter of the sidewall 26 at strengthening rib 42a is 38.80 millimeters, the diameter of the sidewall 26 at strengthening rib 42b is 37.90 millimeters, and the diameter of the sidewall 26 at strengthening rib 42c is 37.00 millimeters. Further, each strengthening rib 42 includes a curvature having a radius as the strengthening rib transitions to the adjacent strengthening rib. In the representative embodiment of the invention, the curvature has a radius ranging from 0.23 to 0.25 millimeters. In addition, each strengthening rib 42 has a height ranging from 4.10 to 3.87 millimeters. According to the representative embodiment of the invention, the height of strengthening ribs 42 closer to the bottom 24 of the cup 22 are larger than the height of strengthening ribs 42 closer to the top 27 of the cup 22. For example, the height of strengthening rib 42c is greater than the height of strengthening rib 42b, which is greater than the height of strengthening rib 42a. The above results in a cup 22 that advantageously stacks during storage and shipment of the empty cup 22 with minimal interference between adjacent cups 20.

In varying embodiments of the invention, the diameter of sidewall 26 may decrease by more or less than 0.90 millimeters as the ribbed section 40 progresses to the bottom 24 of the cup 22, as shown in FIG. 2. In addition, each strengthening rib 42 may adjust the diameter of the sidewall 26 of the cup 20 by a value independent from the other strengthening ribs 42. FIG. 2 further illustrates that the sidewall 26 may be oriented vertically at each strengthening rib 42. However, it is also contemplated that the sidewall 26 at each strengthening rib 42 may continue to individually taper at any angle more or less than 5°. In other embodiments of the invention, each strengthening rib may have a height that is outside the range of 4.10 to 3.87 millimeters and vary irrespective of adjacent strengthening ribs.

As discussed in more detail below, such a ribbed section 40 not only strengthens and structurally rigidifies the cup 22, but in doing so such a ribbed sidewall construction produces a stronger and more collapse-resistant pierceable cup 22 and pierceable beverage-making cartridge that advantageously better enables or facilitates puncturing of the cup 22 during use in a beverage-making apparatus by better resisting denting, folding, or collapsing of any portion of the cup 22 during puncturing of the cup 22 by the beverage-making apparatus. A cup 22 having a sidewall 26 of ribbed sidewall construction with such a ribbed section 40 integrally formed therein also helps strengthen and/or structurally rigidify the bottom portion of the cup 22, including the portion of the bottom 24 of the cup, thereby helping to prevent the portion of the bottom 24 being punctured by the beverage-making apparatus from denting, folding, buckling, collapsing or otherwise deforming during puncturing of the bottom 24 of the cup 22. A cup 22 three dimensionally contoured or three-dimensionally configured in accordance with the present invention with such a ribbed section 40 enables the cup 22 to be formed, e.g., thermoformed, vacuum-molded, etc. using one or more of the aforementioned thermoplastic materials, including those composed of or including recycled or recyclable plastics, e.g., polypropylene, but have a thinner cup sidewall thickness that facilitates piercing or puncturing during beverage making in a beverage making apparatus without the sidewall denting, folding, buckling, collapsing or otherwise deforming during puncturing or piercing of the cup 22.

Referring to both FIGS. 2 and 5, the cup 22 has an annular stacking shoulder 44 integrally formed along a bottom portion of the sidewall 26 of the cup 22 that includes a bottom-strengthening heel 46 to serve as transition between a bottom portion of the sidewall 26 and the bottom 24 of the cup 22. The bottom-located stacking shoulder 44 can and preferably includes the bottom-most rib 42c of the ribbed section 40 of the cup sidewall 26. In instances where the bottom stacking shoulder 44 includes the bottom-most rib 42c of the ribbed section 40 of the sidewall 26, the radially outermost extent of the bottom-most rib 42c is greater than the outermost extent producing a stacking shoulder 44 located on the bottom of the cup 22. That is, the diameter of the bottom-most rib 42c is greater than the diameter of the stacking shoulder 44 to assist with stacking of the cups 22.

By having the diameter of the stacking shoulder 44 less than the diameter of the bottom-most rib 42c, the cups 22 are able to be stacked and nested with minimal interference between adjacent cups 22.

Further, the height or axial length of the stacking shoulder 44 is greater than the height or axial length of the upper shoulder 34 to prevent interference between the upper shoulder 24 of stacked cups 22. By virtue of the height or axial length of the bottom stacking shoulder 44 being greater than the height or axial length of the upper shoulder 34, the bottom stacking shoulder 44 controls the stack height or separation between a plurality of stacked cups 22, as opposed to the upper shoulder 34.

The bottom-located stacking shoulder 44 preferably also includes an annular generally outwardly or convexly rounded bottom rib 48 having a radius of curvature of at least 1 millimeter, preferably at least 2 millimeters, and more preferably at least 3 millimeters, which can be and preferably is a generally toroid-shaped bottom-strengthening rib 48 extending along the very bottom corner or heel 46 of the sidewall 26 of the cup 22. For example, the representative embodiment of the invention includes a radius of curvature of 1.42 millimeters. In addition, the curvature of the strengthening rib 48 may extend to orient the sidewall 26 at an undercut/draft angle up to 13° and preferably up to 8° inward, as shown in FIG. 2. The above features advantageously assist with stacking and nesting of cups 22 during storage and shipping of the cups.

By integrally forming the bottom-most rib 48 in the sidewall 26 so the rib 48 has a radius of curvature greater than that of a conventional rounded bottom corner of a conventional beverage cartridge cup, such a rib 48 helps not only to form the bottom stacking shoulder 44 of the cup 22 but also helps produce a cup 22 having a stiffer and stronger cup bottom which in turn helps impart greater stiffness to the bottom 24 of the cup 22 advantageously also helping to make it easier to puncture the cup bottom 24 during beverage making.

The ability to pierce the cup 22 is even further increased by a concave generally domed-shaped center bottom wall section 50 integrally formed in the cup bottom 24 that increases the draw ratio with respect to an annular puncture region 52 defined by a generally planar or flat outer bottom wall section 54 that encircles the center section 50. By forming the cup bottom 24 with a generally hemispherical center-section 50, it creates a draw ratio between it and the annular flat bottom wall section 54 that reduces the cross-sectional thickness of the flat bottom wall section 54 that makes it easier for a beverage-making apparatus to puncture through the defined puncture region 52. In other words, the dome-shaped circular center section 50 formed in the cup bottom 24 is in the form of a concave recess 55 formed in the exterior of the cup bottom 24, which in turn produces a convex generally hemispherical dome 57 within the cup 22 that is upraised from the cup bottom.

A cup 22 of the present invention is well suited for use as a container 20 of a beverage cartridge for use in a single-serving beverage maker, such as the type commonly used to brew coffee or make tea. Such a cup 22 also advantageously enables recycled or recyclable plastic to be used to make the cup 22. Such a cup 22 also advantageously enables the cup 22 to be made of such material and be of a relatively cross-section thickness that preferably is no greater than 1 millimeter thick, preferably no greater than about 0.5 millimeters thick (0.5 mm±10%), and more preferably no greater than about 0.25 millimeters thick (0.25 mm±10%) and be puncturable without folding, buckling, collapsing, or otherwise undesirably deforming. In a preferred embodiment, the cup sidewall 26 preferably has a thickness no greater than 0.30 millimeters, and preferably has a thickness no greater than about 0.20 millimeters (0.20±10%). In other embodiments of the invention, the thickness of the sidewalls 26 is preferably no greater than 15 mils, preferably no greater than 12 mils, and more preferably no greater than 8 mils thereby improving the ability of the cup 22 to be punctured during beverage making use.

Referring again to FIG. 2, a preferred embodiment of the invention of a container 20 that is preferably a single-serving cup 22 constructed in accordance with the present invention has a height no greater than 60 millimeters, preferably no greater than about 58 millimeters (58 mm±10%), and more preferably no greater than about 56 millimeters (56 mm±5%). For example, the representative embodiment of the invention has a height of 44.88 millimeters, but may be any height less than or equal to 60 millimeters. The container 20 further has an inner diameter along its top or rim of no greater than 50 millimeters, preferably no greater than about 48 millimeters (48 mm±10%), and more preferably no greater than about 45 millimeters (45 mm±5%), and has an inner diameter along the bottom of no greater than 40 millimeters, preferably no greater than about 38 millimeters (38 mm±10%), and more preferably no greater than about 36 millimeters (36 mm±5%). FIG. 2 depicts a container having an inner diameter of 45.52 millimeters at its top and an inner diameter of 35.38 millimeters along the bottom, but other embodiments of the invention may have an inner diameter at its top of less than 50 millimeters and an inner diameter along the bottom of less than 40 millimeters. The container 20 may also include a cup sidewall thickness of no greater than 12 mils, preferably no greater than about 10 mils (10 mils±1.5 mils), and more preferably no greater than about 8 mils (8 mils±1 mil). In one such preferred embodiment, cup 22 is comprised of a recyclable thermoplastic material, preferably a bio-based resin, more preferably a polypropylene base resin, and even more preferably a recycled polypropylene base resin.

FIGS. 6-12 illustrate another preferred embodiment of a container 120 that preferably is cup-shaped, e.g., a cup 122, formed of plastic that is configured for use in a single-serving beverage cartridge (not shown) of a beverage preparation system that is used in a beverage-making apparatus such as for making a single serving of coffee, tea or the like. The single-serving beverage cartridge cup 122 has a bottom 124 from which upwardly extends an endless generally cylindrical sidewall 126 defining an open top 128 through which one or more beverage-making ingredients can be and preferably are introduced in making a single-serving beverage cartridge. Although not shown, the beverage-making ingredients can be in the form of ground, pulverized, dried, e.g., freeze dried, powdered, or other type of beverage-making ingredients in dry form from which a liquid beverage can be made when infused into water introduced into the container. Also not shown is a filter made of cellulose and/or synthetic fiber that can be of conical, circular or cylindrical construction that also is introduced through the container opening either separately or together with the beverage-making ingredients forming a single-serving beverage cartridge that includes a lid covering the opening. With the lid covering the container opening enclosing the beverage-making ingredients and filter within the container, the cup 122 forms a single-serving cartridge of pre-packaged and ready to use construction that can be sold in such a form for consumer use.

Examples of in-cup filters suitable for use with the cup 122 of the present invention in making such a single-serving beverage cartridge formed with or using the cup 122 of the present invention are shown and disclosed in U.S. Pat. Nos. 5,325,765; 6,645,537; and/or 8,474,368, the entirety of each of which is hereby expressly incorporated herein by reference. When such an in-cup filter is placed, inserted or formed in or with the cup 122 and beverage-making ingredients dispensed in the cup 122 before the cup opening 128 is covered with a lid, a single-serving beverage cartridge is formed that is of a type like those shown and disclosed in U.S. Pat. Nos. 5,325,765, 6,645,537, and/or 8,474,368, the entirety of each of which is hereby expressly incorporated herein by reference.

The cup 122 is molded, preferably thermoformed, and more preferably vacuum-thermoformed of a plastic, such as polystyrene, ethylene vinyl alcohol, polyethylene, or polylactide aliphatic copolymer, e.g., CPLA, which enables a three-dimensionally contoured imperforate and impermeable container 120 to be formed that is in the shape of cup 122 for use in making a beverage making cartridge for use in single-serving beverage makers used to make coffee, tea, or another hot-water brewed beverage. The cup 122 can also be formed of other materials, including thermoplastic materials that can be or otherwise include polyolefins like polypropylene, polyethylene, polystyrene, nylon, and other suitable thermoplastic polymers.

As discussed in more detail below, the three-dimensional configuration of such a cup 122 of the present invention particularly enables the cup 122 to be formed of a more recyclable thermoplastic material, such as a bio-based resin, preferably a polypropylene base resin, and more preferably a recycled polypropylene base resin, and yet still be punctured without substantial deformation of the cup 122 during beverage making. Any of the aforementioned thermoplastic materials from which cup 122 can be made can also be or include a blend, such as where the thermoplastic material is blended with one or more additives that include acrylics, styrenics, e.g., styrenes, polyolefin copolymers, which can be immiscible in nature. Such additives can be or also include one or more crack nucleating agents like calcium stearate, magnesium stearate, zinc stearate, calcium carbonate, talc, clay(s), e.g., smectite, bentonite, montmorillonite, etc., and the like. Any of these additives can be in Nano particle form.

In a preferred embodiment, the cup 122 is molded, preferably thermoformed, and more preferably vacuum-thermoformed of a multilayered film or laminate material having at least a plurality of layers and more preferably having at least a plurality of pairs of, i.e. at least 3, layers with at least one of the layers made or otherwise composed of a recyclable or recycled plastic material that preferably is a bio-based resin, more preferably is a polypropylene resin, and even more preferably is a recycled polypropylene resin. In a preferred embodiment, one or more of the layers can be and preferably are made of re-grind material, preferably regrind polypropylene material, or another suitable regrind thermoplastic polymeric material. In a preferred embodiment, cup 122 is molded from a multilayer laminate material having at least 5 layers that include a thermoplastic polymer layer, a tie layer, a barrier layer, another tie layer, and another thermoplastic layer with one or both thermoplastic layers made or otherwise composed of a recyclable or recycled plastic material that preferably is a bio-based resin, more preferably is a polypropylene resin, and even more preferably is a recycled polypropylene resin that can be a blend containing one or more of the aforementioned additives. In another preferred embodiment, cup 122 is molded from a multilayer laminate material having at least 7 layers that include a first thermoplastic polymer layer, a first regrind layer, a first tie layer, a first barrier layer, a second tie layer, a second regrind layer, and a second thermoplastic layer with one or both thermoplastic layers made or otherwise composed of a recyclable or recycled plastic material that preferably is a bio-based resin, more preferably is a polypropylene resin, and even more preferably is a recycled polypropylene resin that can be a blend containing one or more of the aforementioned additives If desired, one or more of the layers can be or otherwise form a barrier layer and/or a tie layer as is known in the art. Examples of suitable multilayer laminate materials from which a cup 122 constructed in accordance with the present invention can be molded are disclosed in U.S. Pat. No. 9,114,902, the entirety of which is hereby expressly incorporated herein by reference. U.S. Pat. No. 9,114,902 also shows and discloses molds, molding apparatus and a method of molding that can be used to make cup 122.

Figure 6:
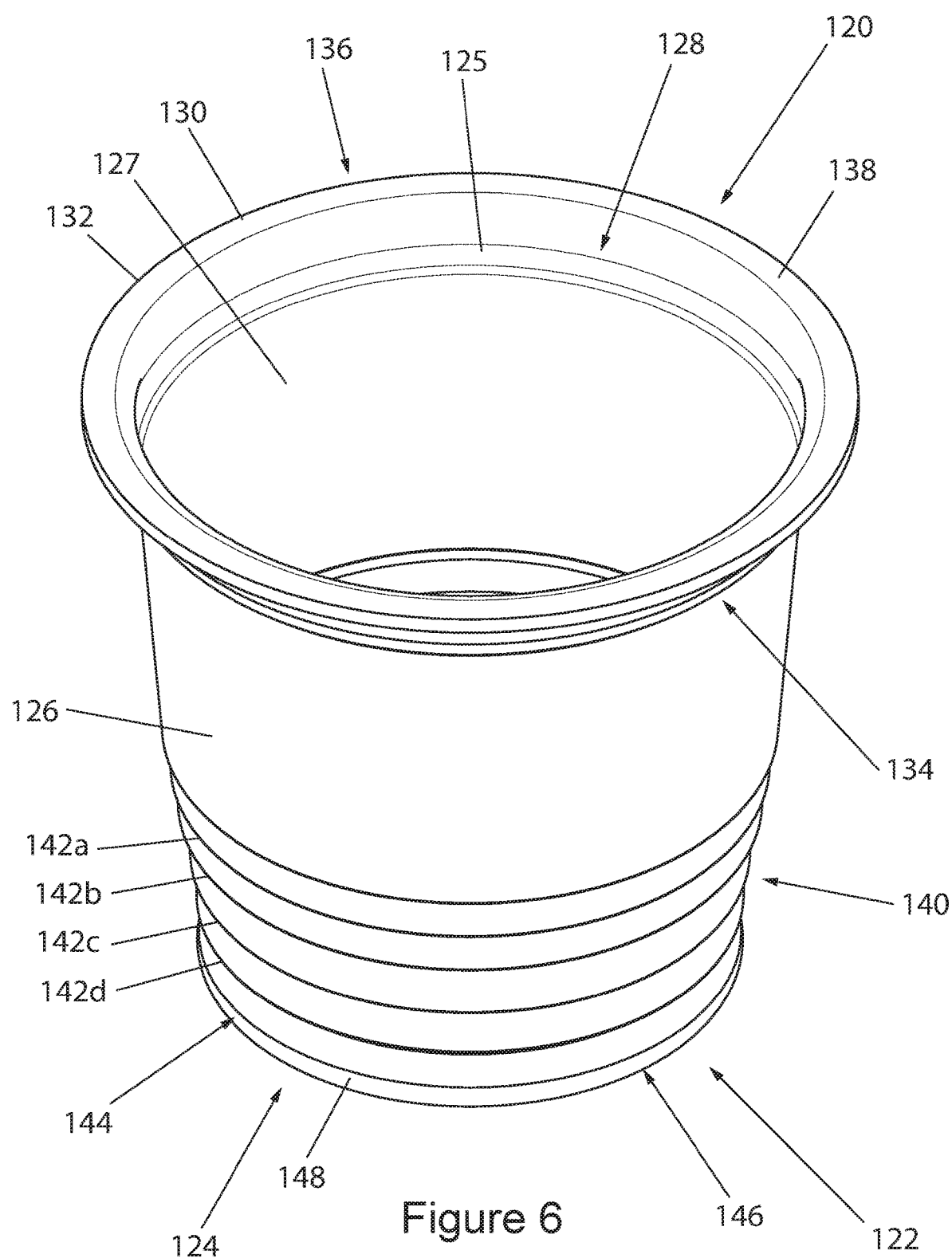
FIG. 6 is a top front perspective view of a container or cup for use in making a single-serving cartridge, according to another embodiment of the invention.
Figure 7:
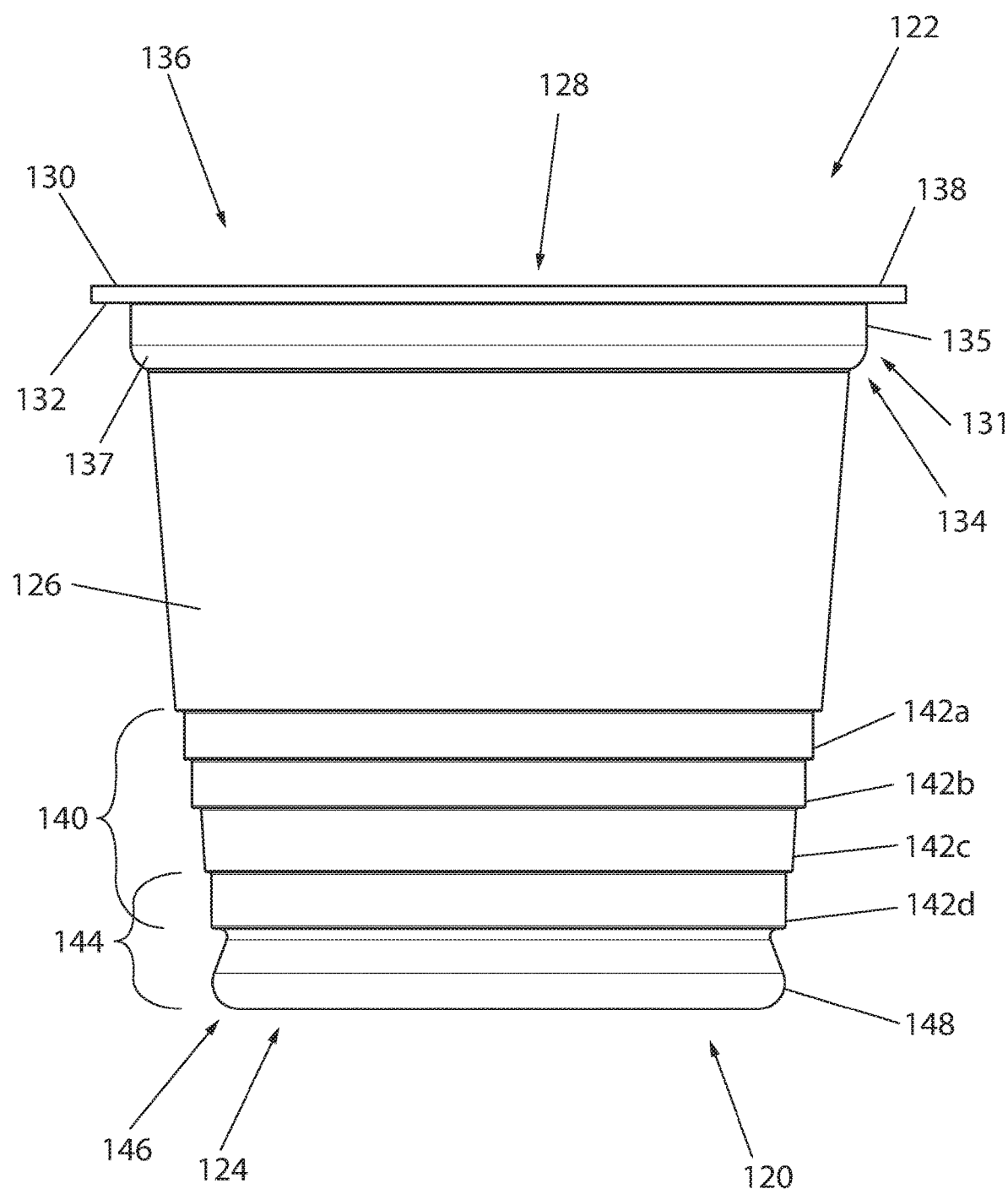
FIG. 7 is a side elevation of the container or cup of FIG. 6.
Figure 8:
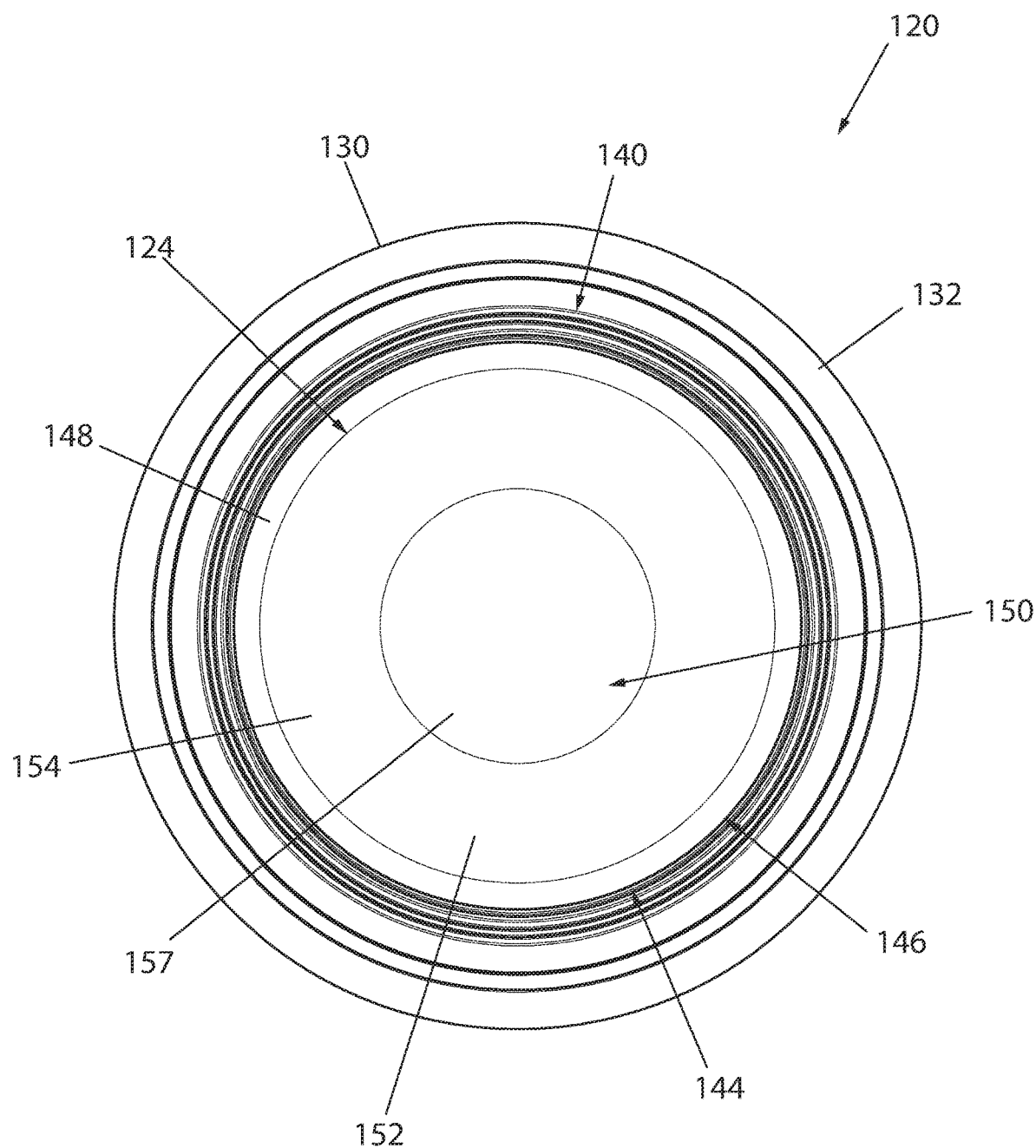
FIG. 8 is a bottom plan view of the container or cup of FIG. 6.
Figure 9:
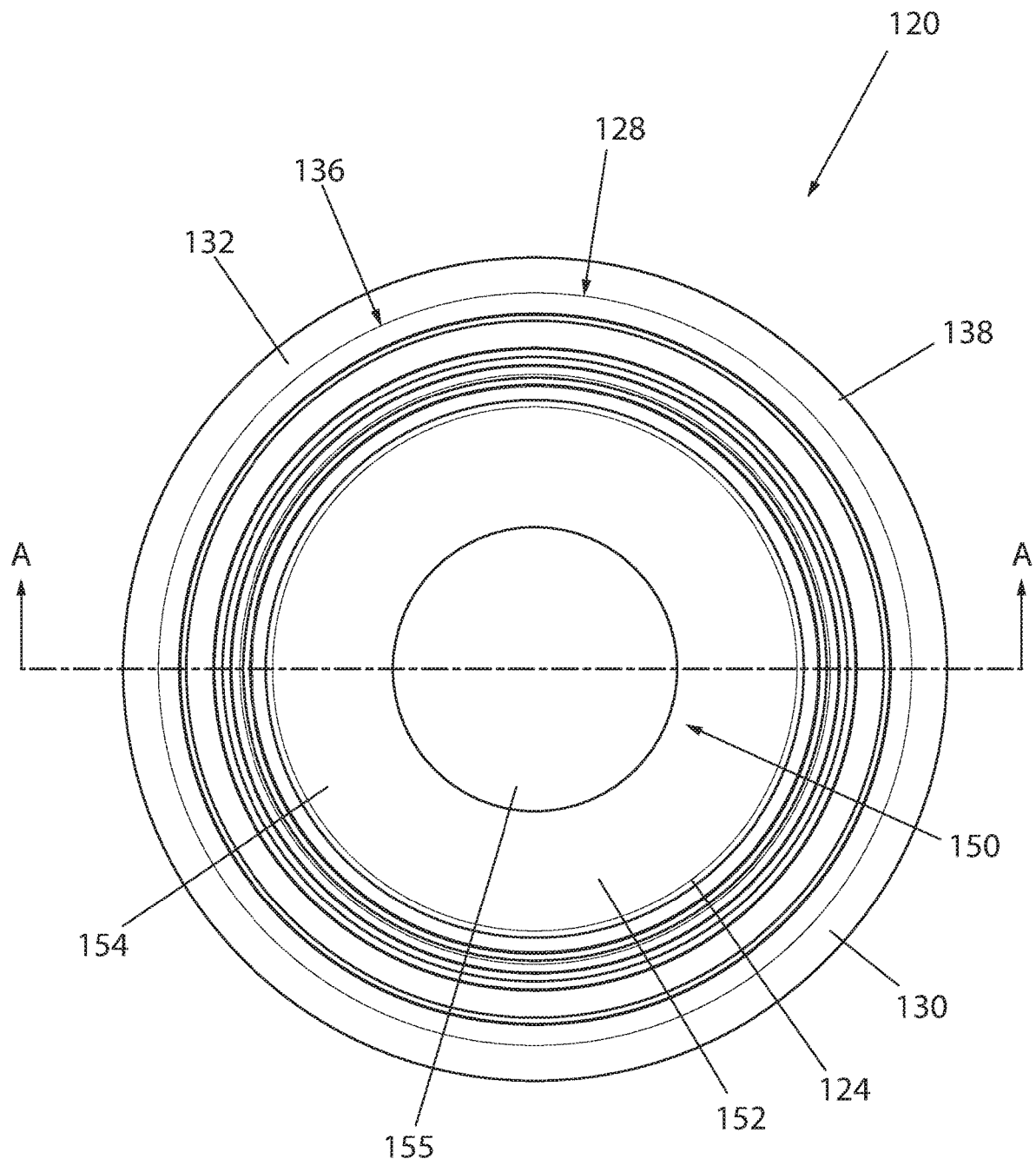
FIG. 9 is a top plan view of the container or cup of FIG. 6.

With continued reference to FIGS. 6 and 7, the opening 128 at the top of the cup 122 is bounded by a lip 130 formed of a flange 132 that extends radially outwardly from an annular shoulder 134 formed in a top or upper portion of the cup sidewall 126. Annular shoulder 134 is formed of a diametrically expanded segment 135 of the sidewall 126 that extends downwardly from the lip 130 or flange 132 to a diametrically reducing bevel 137 that extends radially outwardly about the periphery of the sidewall as best shown in FIG. 7.

Figure 10:
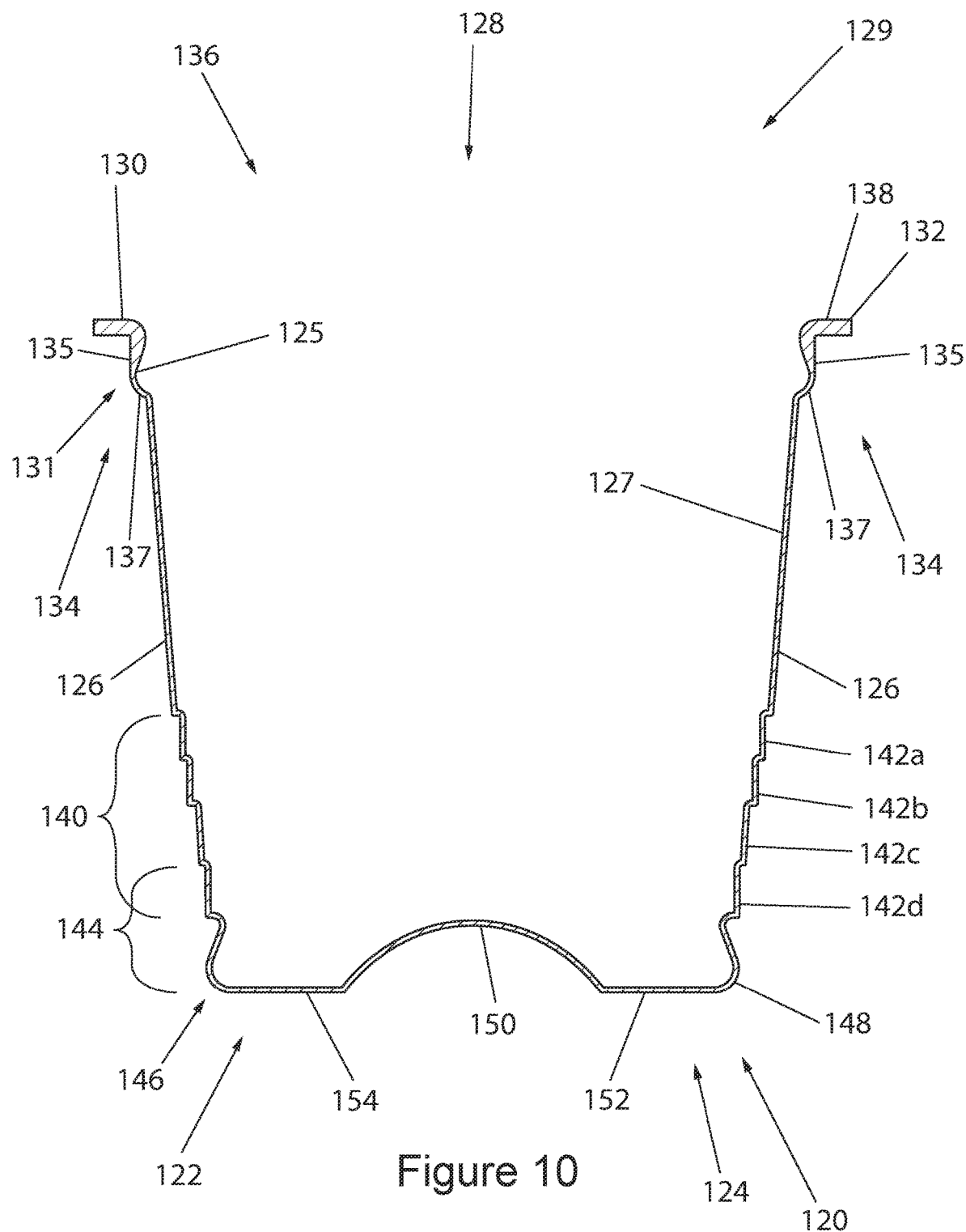
FIG. 10 is a cross-sectional view of the container or cup of FIG. 9 taken through the cut A-A.

The shoulder 134 is formed without draft, e.g., without backdraft, as depicted in FIG. 10 thereby defining an annular filter seat 125 along part of an interior surface 127 of the sidewall 126 providing greater surface area for filter attachment during beverage cartridge assembly. Because the cup 122 is molded with a shoulder 134 that is of draft-less construction by being formed with no draft whatsoever, doing so creates a filter seat 125 having more surface area for the filter to contact during attachment, e.g., adhesive attachment, thermal welding, sonic welding, or the like, of part of the filter to the seat 125.

Such a shoulder 134 formed without a draft, e.g., without a backdraft, formed of diametrically expanded portion of the cup sidewall 126 disposed along a top 129 of the cup 122 also defines an external cup-carrier seat 131 enabling the shoulder 134 to be received in a cup-carrier of a beverage cartridge filling line. Therefore, a cup 122 three-dimensionally formed or three-dimensionally contoured in accordance with the present invention has such an integrally formed, e.g., molded, thermoformed, vacuum-formed, etc., with such a draft-less shoulder 134 is advantageous because the draft-less shoulder 134 externally defines a cup-carrier seat 131 on one side of sidewall 126, and internally defines a filter-attachment seat 125.

The lip 130 or flange 132 that bounds the opening 28 at the top of the cup 122 also defines a mouth 136 of the cup 122 through which beverage-making ingredients and/or the filter is inserted during beverage cartridge assembly. A lid or cover is attached to the cup 122 to complete assembly of the beverage cartridge using cup 122 of the present invention preferably with at least part of the lid or cover sealed, preferably hermetically sealed, to a top surface 138 of the lip 130. When sealed to the lip 130 of the cup 122, a hermetically sealed beverage making cartridge also of the present invention is formed that keeps the beverage making ingredients ready to brew for several months, if not longer, advantageously producing a beverage making cartridge having a long shelf life.

The sidewall 126 of the cup 122 is of endless construction and preferably diametrically tapers as the sidewall 126 extends axially downwardly toward the bottom 124 of the cup 122. In a preferred embodiment, the sidewall 126 diametrically tapers from at or adjacent the shoulder 134 and/or lip 130 of the cup 122 all the way to the bottom 124 of the cup 122. Such a diametrically tapering cup sidewall 126 can and preferably does produce a cup 122 with a generally frustoconical sidewall 126.

The cup sidewall 126 also has a cup-strengthening ribbed section 140 formed along a lower or bottom portion of the sidewall 126 to or adjacent the bottom 124 of the cup 122. As is best shown in FIG. 7, ribbed section 140 is formed of at least a plurality, preferably at least a plurality of pairs, i.e., at least three, sidewall and cup strengthening ribs 142a, 142b, 142c, and 142d axially spaced apart but axially stacked upon one another such that each one of the ribs 142a, 142b, 142c, and 142d is disposed axially adjacent and/or axially adjoins an adjacent another one of the ribs 142a, 142b, 142c, and 142d. In the preferred cup embodiment shown in FIGS. 7-12, the ribbed section 140 extends upwardly from at or adjacent the bottom 124 of the cup 122 at least one-fifth, preferably at least one-fourth, and more preferably at least one-third the axial length of the sidewall 126 toward the flange 132 or lip 130 at the top of the cup 122.

As discussed in more detail below, such a ribbed section 140 not only strengthens and structurally rigidifies the cup 122, but in doing so such a ribbed sidewall construction produces a stronger and more collapse-resistant pierceable cup 122 and pierceable beverage-making cartridge that advantageously better enables or facilitates puncturing of the cup 122 during use in a beverage-making apparatus by better resisting denting, folding, or collapsing of any portion of the cup 122 during puncturing of the cup 122 by the beverage-making apparatus. Such a cup 122 having such a sidewall 126 of ribbed sidewall construction with such a ribbed section 140 integrally formed therein also helps strengthen and/or structurally rigidifies the bottom portion of the cup 122, including the portion of the bottom 124 of the cup, thereby helping to prevent the portion of the bottom 124 being punctured by the beverage-making apparatus from denting, folding, buckling, collapsing or otherwise deforming during puncturing of the bottom 124 of the cup 122. Such a cup 122 three dimensionally contoured or three-dimensionally configured in accordance with the present invention with such a ribbed section 140 enables the cup 122 to be formed, e.g., thermoformed, vacuum-molded, etc. using one or more of the aforementioned thermoplastic materials, including those composed of or including recycled or recyclable plastics, e.g., polypropylene, but have a thinner cup sidewall thickness that facilitates piercing or puncturing during beverage making in a beverage making apparatus without the sidewall denting, folding, buckling, collapsing or otherwise deforming during puncturing or piercing of the cup 122.

With continued reference to FIG. 7 and additional reference to FIG. 10, the cup 122 has an annular stacking shoulder 144 integrally formed along a bottom portion of the sidewall 126 of the cup 122 that also includes a bottom-strengthening heel 146 of the cup 122 that serves to transition between a bottom portion of the sidewall 126 and the bottom 124 of the cup 122. The bottom-located stacking shoulder 144 can and preferably also does include the bottom-most rib 142*d* of the ribbed section 140 of the cup sidewall 126. Where the bottom stacking shoulder 144 includes the bottom-most rib 142*d* of the ribbed section 140 of the sidewall 126, the radially outermost extent of the bottom-most rib 142*d* is no greater than the radially outermost extent producing a stacking shoulder 144 located on the bottom of the cup 122 having a height or axial extent that is greater than the height or axial extent of the upper shoulder 134 of the cup 122. As a result of the height or axial extent of the bottom stacking shoulder 144 being greater than the height or axial extent of the upper shoulder 134, interference between the upper shoulders 134 of stacked cups 122 is prevented. By virtue of the height or axial extent of the bottom stacking shoulder 144 being greater than the height or axial extent of the upper shoulder 134, the bottom stacking shoulder 144 and not the upper shoulder 134 controls the stack height or separation between a plurality of cup 122 stacked within one another.

The bottom-located stacking shoulder 144 preferably also includes an annular generally outwardly or convexly rounded bottom rib 148 having a radius of curvature of at least one millimeter, preferably at least two millimeters, and more preferably at least three millimeters, which can be and preferably is a generally toroid-shaped bottom-strengthening rib 148 that extends along the very bottom corner or heel 146 of the sidewall 126 of the cup 122. By integrally forming the bottom-most rib 48 in the sidewall 126 so the rib 148 has a radius of curvature greater than that of a conventional rounded bottom corner of a conventional beverage cartridge cup, such a rib 148 helps not only to form the bottom stacking shoulder 144 of the cup 122 but the rib 148 helps produce a cup 122 having a stiffer and stronger cup bottom which in turn helps impart greater stiffness to the bottom 124 of the cup 122 advantageously also helping to make it easier to puncture the cup bottom 124 during beverage making.

The ability to pierce the cup 122 is even further increased by a concave generally dome-shaped center bottom wall section 150 integrally formed in the cup bottom 124 that increases the draw ratio with respect to an annular puncture region 152 defined by a generally planar or flat outer bottom wall section 154 that encircles the center section 150. By forming the cup bottom 124 with a generally hemispherical center-section 150, it creates a draw ratio between it and the annular flat bottom wall section 154 that reduces the cross-sectional thickness of the flat bottom wall section 154 that makes it easier for a beverage-making apparatus to puncture through the puncture region 152 defined thereby.

A cup 122 of the present invention is well suited for use as a container 120 of a beverage cartridge for use in single-serving beverage makers, such as of the type commonly used to brew coffee or make tea. Such a cup 122 also advantageously enables recycled or recyclable plastic to be used to make the cup 122. Such a cup 122 also advantageously enables the cup 122 to be made of such material and be of a relatively cross-section thickness that preferably is no greater than one millimeter thick, preferably no greater than about 0.5 millimeters thick (0.5 mm 10%), and more preferably no greater than about 0.25 millimeters thick (0.25 mm±10%) and be puncturable without folding, buckling, collapsing, or otherwise undesirably deforming. In a preferred embodiment, cup sidewall 126 preferably has a thickness no greater than 0.30 millimeters, and preferably has a thickness no greater than about 0.20 millimeters (0.20 mm±10%).

The bottom 124 of the cup 122 has a generally concave and substantially hemispherical center section 150 encircled by a generally annular flat bottom wall section 154 that defines an annular puncture region 152 of the cup 122. The concave dome-shaped center section 150 is integrally formed in the cup bottom 124 to create draw ratio with respect to the generally annular flat puncture region 152 formed by the annular flat bottom wall 154 thinning the cross-sectional thickness of the annular flat bottom wall 154 making it easier to puncture through the puncture region 152. By forming the cup bottom 124 with such a recessed dome-shaped circular center section 150, it enables the cup 122 to be made with such a relatively thin wall thickness of sidewall 126 that preferably is no greater than 15 mils, preferably no greater than 12 mils, and more preferably no greater than 8 mils thereby improving the ability of the cup 122 to be punctured during beverage making use. In other words, the dome-shaped circular center section 150 formed in the cup bottom 124 is in the form of a concave recess 155 formed in the exterior of the cup bottom 124 which in turn produces a convex generally hemispherical dome 157 within the cup 122 that is upraised from the cup bottom 124.

Figure 11:
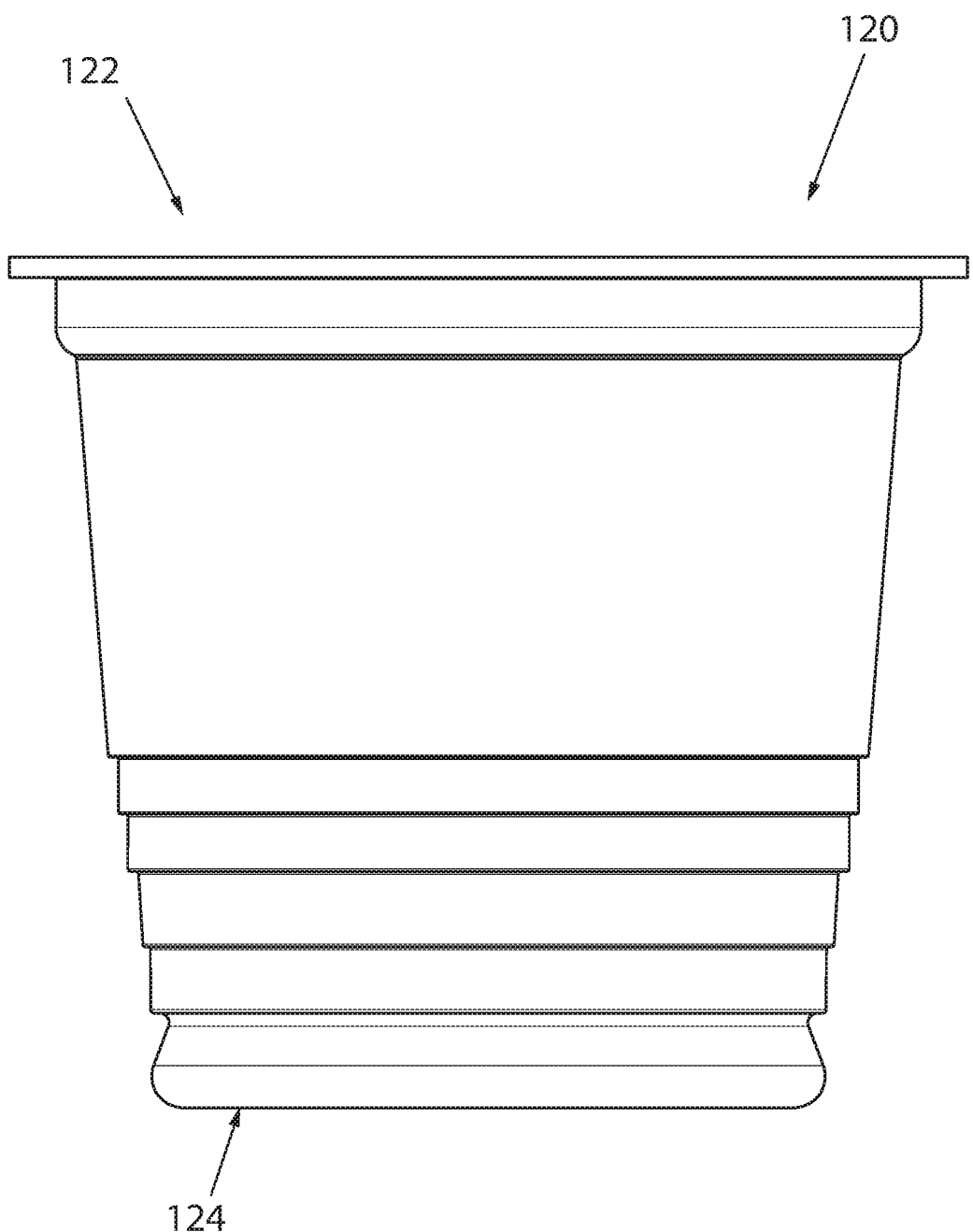
FIG. 11 is a side elevation view of the cup or container depicting the height of the cup or container.
Figure 12:
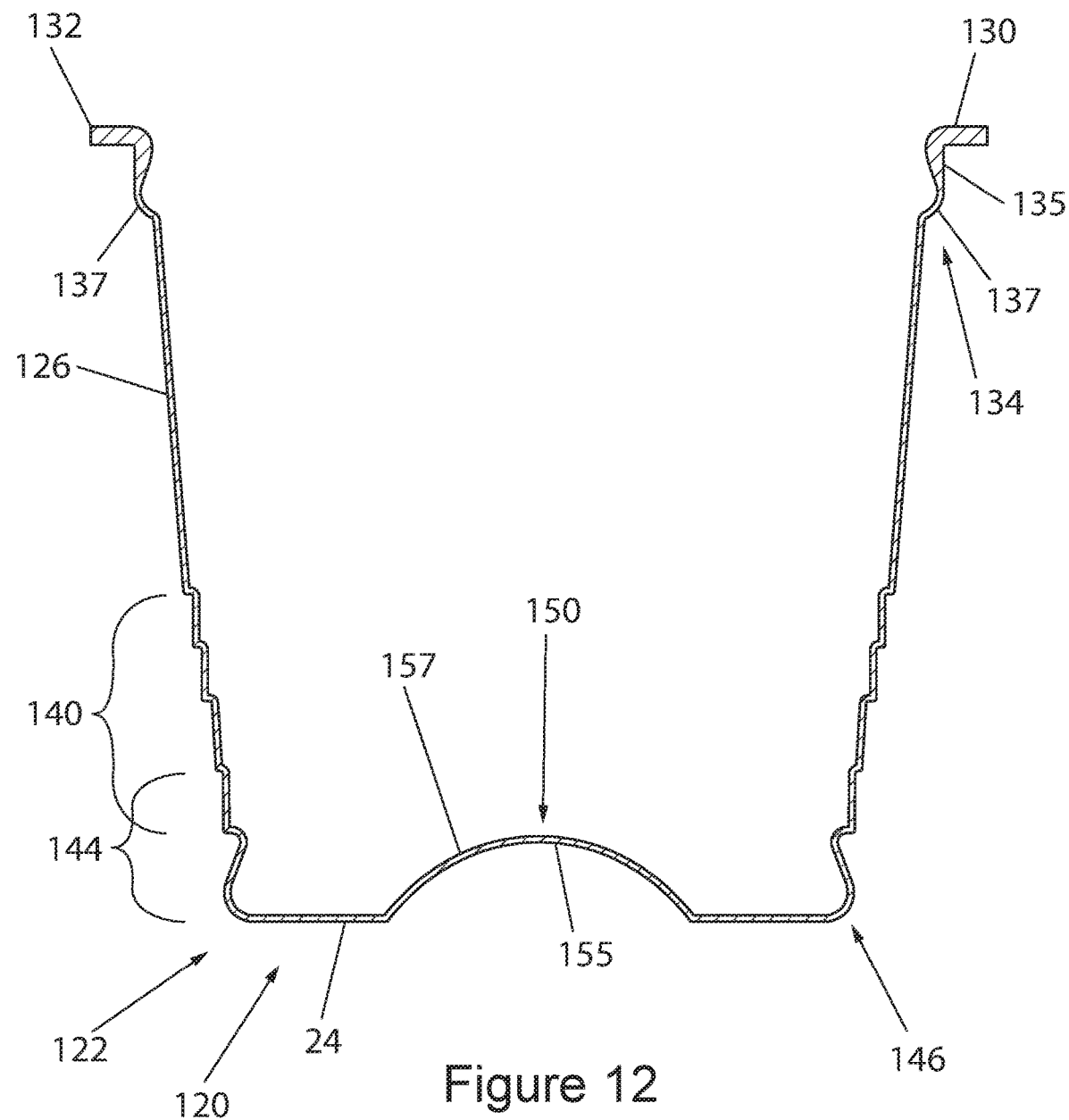
FIG. 12 is a cross-sectional view of the cup or container with various dimensions and parameters relating to inventive aspects of the cup or container.

With reference to FIG. 11, a preferred embodiment of a container 120 that preferably is a single-serving cup 122 constructed in accordance with the present invention has a height no greater than 160 millimeters, preferably no greater than about 58 millimeters (58 mm±10%), and more preferably no greater than about 56 millimeters (56 mm±5%), has an inner diameter along its top or rim of no greater than 50 millimeters, preferably no greater than about 48 millimeters (48 mm±10%), and more preferably no greater than about 45 millimeters (45 mm±5%), has an inner diameter along bottom of no greater than 40 millimeters, preferably no greater than about 38 millimeters (38 mm±10%), and more preferably no greater than about 36 millimeters (36 mm±5%), and has a cup sidewall thickness of no greater than 12 mils, preferably no greater than about 10 mils (10 mils±1.5 mils), and more preferably no greater than about 8 mils (8 mils±1 mil). In one such preferred embodiment, cup 122 is comprised of a recyclable thermoplastic material, preferably a bio-based resin, more preferably a polypropylene base resin, and even more preferably a recycled polypropylene base resin With respect to the cup 22 shown in FIGS. 1-5, and the cup 122 shown in FIGS. 6-12, such a cup 22, 122 constructed in accordance with the present invention has a stack feature or stacking feature at or adjacent the bottom of the cup 22, 122 which is commonly accomplished by having a stack or stacking lug at the top of the cup which ordinarily appears or looks like the shoulder feature. Instead, in such a cup 22, 122 constructed in accordance with the present invention, the stack feature or stacking feature includes stacking shoulder or shoulders 44, 144 formed at or adjacent a bottom of the cup 22, 122 instead of at the top of the cup 22, 122 with the height of the stack feature or stacking feature shoulder 44, 144 controlling the stack height of stacked or nested cups 22, 122 or the separation between stacked or nested cups 22, 122. The bottom stack feature-or stacking feature in the form of the stacking shoulder 44, 144 is taller than the shoulder feature 34, 134 thereby preferably preventing interference between stacked or nested cups 22, 122 from occurring at the shoulder feature 34, 134 or, in other words, making any interference that may occur at the location of the shoulder feature 34, 134 of stacked or nested cups 22, 122 non-effective. The three-dimensional contour, shape or configuration of the bottom stack feature or bottom stacking feature, such as the annular stacking shoulder 44, 144 also produces a stronger cup bottom by more specifically strengthening the cup heel or bottom cup corner thereby enabling puncturing of the bottom of the cup 22, 122 to be done in making a single serving beverage without damaging any other portion of the cup 22, 122 nor otherwise adversely affecting structural integrity of any portion of the cup 22, 122. Such a bottom stack feature or bottom stacking feature can and preferably also is in the form of an annular enlarged bottom stiffening rib that forms the bottom corner of the cup 22, 122 or is formed along the bottom corner of the cup 22, 122 even further strengthening the region of the cup bottom surrounding the puncture region of the cup bottom thereby preventing it from collapsing, buckling or otherwise deforming during puncturing of the cup 22, 122 during single serving beverage use.

With respect to the annular shoulder 34, 134 of the cup 22, 122, this feature is commonly a back drafted feature that is used to create separation between the parts. This is not intended to be a stack feature and evidence of that is the straight sidewall. To be an effective stack feature this must have back draft. The second evidence is the height of this feature is shorter than the stack feature in the bottom of the cup making it nonfunctional. The annular shoulder 34, 134 advantageously has two intended uses. The first use is for creating an area for the filter to be attached to the cup. This is an improved feature over other cups. Because it has no draft it creates more area for the filter to make contact with the cup 22, 122 during the filter welding process. The second use is during the cup filling process as it enables cups 22, 122 constructed in accordance with the present invention to be placed in a cup transport carrier that moves the cups 22, 122 down the processing line. The construction and arrangement of this annular shoulder 34, 134, including it radially outwardly extending lip or rim encircling the mouth of the cup 20, 120 provides a very consistent resting area for the cups 22, 122 to rest against or on an encircling portion of a respective single cup holder of the carrier that holds each cup 22, 122. As a result, transport of the cups 20, 120 in cup holders of the carrier is done stably with ease enabling cups to be transported by the carrier at relatively high speeds.

The dome-shaped center bottom wall section 50, 150 in the cup 22, 122 is to create a desired draw ratio when thermoforming the cup 22, 122 from a thermoformable sheet of plastic or other thermoformable material. The height of the dome-shaped center bottom wall section 50, 150 produces a thinning of the flat region of the bottom of the cup 22, 122 that surrounds or encompasses an upraised puncture region of the cup bottom that can be and preferably is dome-shaped, recessed and upraised into the liquid-holding interior of the cup 22, 122. This thinning in the material that forms the bottom of the cup 22, 122 is critical in allowing the puncture region of the bottom of the cup 22, 122 to puncture with minimal force. If the flat region surrounding the puncture region along the bottom of the cup 22, 122 is too thick, the cup 22, 122 will undesirably collapse when attempting to puncture the cup bottom further undesirably preventing puncturing of the cup. In addition, such a desired draw ratio at the dome-shaped center bottom wall section 50, 150 will not only prevent this from happening by ensuring sufficient thickness of the bottom region of the cup 22, 122 surrounding the puncture region, but it will also produce a cup 22, 122 that is stronger and more collapse or crush resistant by causing at least a bottom portion of the cup sidewall at or adjacent the cup bottom to also be thicker. All of this produces a cup 22, 122 in accordance with the invention better able to withstand the force of being punctured while retaining its structural integrity by not collapsing or buckling during the puncture process.

The cup 22, 122 preferably also has a cup-sidewall rigidifying strengthening ribs 42, 142 with at least a plurality, more preferably at least a plurality, i.e., at least three, axially spaced apart radially outwardly extending ribs that each preferably extends continuously circumferentially about the entire cup sidewall exterior or circumference. Such a region of strengthening ribs 42 preferably is thermoformed in the region of the cup sidewall disposed adjacent and above the cup bottom to further help strengthen and rigidify the region of the cup bottom that surrounds or encircles the puncture region. In addition, the inclusion of such a region of strengthening ribs 42 also enables the cup sidewall to be made thinner so that the cup bottom region surrounding the puncture region is thermoformed having a greater amount of material in the cup bottom region surrounding the cup puncture region thereby producing a stiffer, stronger and even more collapse-resistant bottom region surrounding the puncture region enabling puncturing of the cup 22, 122 to be more quickly, easily and repeatably done.

Understandably, the present invention has been described above in terms of one or more preferred embodiments and methods. It is recognized that various alternatives and modifications may be made to these embodiments and methods which are within the scope of the present invention. Various alternatives are contemplated as being within the scope of the claims of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A cup for a single serving cartridge comprising:
   a top with an open mouth;
   a bottom with a bottom wall having a generally planar bottom wall comprised of a puncture region; and
   a sidewall of endless tubular construction having a diametrically expanded upper shoulder at or adjacent the top that defines an external cup carrier and internal filter attachment seat, and a ribbed section comprised of at least a plurality of ribs disposed at or adjacent the bottom of the cup;
   wherein the cup has a bottom stacking shoulder disposed at or adjacent the bottom; and
   wherein the stacking shoulder comprises a generally toroidal rib at the bottom of the cup providing a transition between the sidewall of the cup and the bottom wall of the cup.

2. The cup of claim 1, wherein the generally toroidal rib is convexly curved having a radius of curvature of at least two millimeters.

3. The cup of claim 1, wherein the ribbed section is comprised of at least a plurality of annular axially spaced apart and adjoining ribs.

4. The cup of claim 3, wherein the ribs of the ribbed section form a ribbed section of sawtooth construction.

5. The cup of claim 3, wherein the ribs of the ribbed section each have a generally triangular cross-section.

6. The cup of claim 3, wherein the ribbed section extends along the sidewall of the cup at least one-quarter the axial height of the cup.

7. The cup of claim 3, wherein the ribbed section extends along the sidewall of the cup at least one-quarter the axial height of the cup sidewall.

8. The cup of claim 1, wherein the bottom of the cup has a recessed dome-shaped center section.

9. The cup of claim 8, wherein the bottom of the cup has a puncture region.

10. The cup of claim 9, wherein the puncture region is comprised of an annular generally planar section of the bottom wall of the cup.

11. The cup of claim 1, wherein the top of the cup further comprises a radially outwardly extending flange defining a lip to which a cover or lid is attached in making a beverage cartridge.

12. The cup of claim 11, wherein the cup is formed of a multilayer laminate or film material formed of at least one layer comprised of plastic.

13. The cup of claim 12, wherein the multilayer laminate or film material is formed of at least one layer composed of polypropylene.

14. The cup of claim 13, wherein the polypropylene layer is comprised of polypropylene having at least one additive.

15. The cup of claim 13, wherein the multilayer laminate or film material has at least a plurality of pairs of layers.

16. The cup of claim 1, further comprising a perforate or porous filter is attached to a filter seat formed by an inner surface of the upper shoulder.

17. The cup of claim 1, wherein the sidewall diametrically tapers from the shoulder to the bottom of the cup.

18. The cup of claim 1, wherein the generally toroidal rib at the bottom of the cup orients the sidewall of the cup at a draft angle up to 8° inward.

19. A cup for a single service cartridge comprising:
a top with an open mouth;
a bottom with a bottom wall having a generally planar bottom wall comprised of a puncture region; and
a sidewall of endless tubular construction having a diametrically expanded upper shoulder at or adjacent the top that defines an external cup carrier and internal filter attachment seat, and a ribbed section comprised of at leash a plurality of ribs disposed at or adjacent the bottom of the cue;
wherein the ribbed section is, comprised of at least a plurality of annular axially spaced apart, and adjoining ribs; and
wherein a height of the rib of the ribbed section adjacent the bottom of the cup is greater than a height of a rib of the ribbed section further away from the bottom of the cup.

20. A cup for a single service cartridge comprising:
a top with an open mouth;
a bottom with a bottom wall having a generally planar bottom wall comprised of a puncture region; and
a sidewall of endless tubular construction having a diametrically expanded upper shoulder at or adjacent the top that defines an external cup carrier and internal filter attachment seat, and a ribbed section comprised of at least a plurality of ribs disposed at or adjacent the bottom of the cup;
wherein the ribbed, section is comprised of at least a plurality of annular axially spaced apart and adjoining ribs, and
wherein the ribs of the ribbed section have a height greater than 3.5 millimeters.

* * * * *